US012808442B2

(12) United States Patent
Westermann et al.

(10) Patent No.: US 12,808,442 B2
(45) Date of Patent: Nov. 24, 2026

(54) DIAPHRAGM VALVE

(71) Applicant: BUERKERT WERKE GMBH & CO. KG, Ingelfingen (DE)

(72) Inventors: Jan Westermann, Ingelfingen (DE); Till Sperrle, Ingelfingen (DE); Marcel Konstandin, Ingelfingen (DE); Benjamin Hoefer, Ingelfingen (DE)

(73) Assignee: Buerkert Werke Gmbh & Co. KG, Ingelfingen (DE)

( * ) Notice: Subject to any disclaimer, the term of this patent is extended or adjusted under 35 U.S.C. 154(b) by 75 days.

(21) Appl. No.: 18/742,249

(22) Filed: Jun. 13, 2024

(65) Prior Publication Data

US 2025/0020222 A1 Jan. 16, 2025

(30) Foreign Application Priority Data

Jul. 12, 2023 (DE) ......................... 102023118470.9

(51) Int. Cl.
*F16K 7/12* (2006.01)

(52) U.S. Cl.
CPC .................................... *F16K 7/126* (2013.01)

(58) Field of Classification Search
CPC . F16K 7/12; F16K 7/123; F16K 7/126; F16K 7/14; F16K 7/16
See application file for complete search history.

(56) References Cited

U.S. PATENT DOCUMENTS 3,011,758 A * 12/1961 Mcfarland, Jr. ........ F16K 7/126 92/99
4,231,287 A * 11/1980 Smiley .................. F04B 43/046 417/413.1
4,809,589 A * 3/1989 Bertrand .................... F16J 3/02 73/715
4,836,236 A * 6/1989 Ladisch .................. F16K 27/07 137/241
5,201,492 A * 4/1993 Beauvir .................... F16K 7/16 92/103 M
5,335,691 A * 8/1994 Kolenc ................... F16K 41/12 251/331
6,505,814 B1 * 1/2003 Satou .................... F16K 31/122 137/863

(Continued)

FOREIGN PATENT DOCUMENTS

CN 108825813 A * 11/2018 ............... B32B 7/08
DE 19746763 A1 5/1999

(Continued)

OTHER PUBLICATIONS

Machine English translation of CN-108825813-A (Year: 2025).*
Machine English translation of DE-102016101782-A1 (Year: 2025).*

*Primary Examiner* — Hailey K. Do
(74) *Attorney, Agent, or Firm* — McNees Wallace & Nurick LLC

(57) ABSTRACT

A diaphragm valve has an axially driven valve spindle, a thrust piece, and a diaphragm which includes a diaphragm body associated with the thrust piece and a diaphragm film associated with a valve seat. The valve spindle is drivingly coupled to the diaphragm body via the thrust piece, the diaphragm body being arranged axially between the thrust piece and the diaphragm film. As an example, the diaphragm film has an elastic modulus of at least 1000 MPa.

13 Claims, 9 Drawing Sheets

(56) References Cited

U.S. PATENT DOCUMENTS

| | | | | |
|---|---|---|---|---|
| 6,685,164 | B1 * | 2/2004 | Koizumi | F16K 7/16<br>251/63.4 |
| 7,905,172 | B2 * | 3/2011 | Ohrle | F04B 43/0054<br>417/474 |
| 10,830,184 | B2 * | 11/2020 | Haberland | B01F 23/213 |
| 2006/0289825 | A1 * | 12/2006 | Wincek | F16K 27/0236<br>251/331 |
| 2023/0058255 | A1 * | 2/2023 | Haidt | F16K 7/126 |

FOREIGN PATENT DOCUMENTS

| | | | | |
|---|---|---|---|---|
| DE | 102016101782 | A1 * | 8/2017 | F16K 7/12 |
| EP | 3324084 | A1 | 5/2018 | |
| GB | 1564521 | A | 4/1980 | |
| GB | 2250802 | A | 6/1992 | |

* cited by examiner

DIAPHRAGM VALVE

TECHNICAL FIELD

The disclosure relates to a diaphragm valve having an axially driven valve spindle, in particular for shutting off liquids.

BACKGROUND

Diaphragm valves of this type are known.

The requirements placed on the diaphragms of these valves are frequently subject to changes due to regulatory or statutory provisions, in particular with respect to the materials from which the diaphragms are formed.

Typically, these diaphragms are made from materials having a low elastic modulus or modulus of elasticity, for example of 30 MPa, in order to ensure a good sealing effect and a long useful life or a large number of operating cycles.

The disclosure provides a diaphragm valve having an effective diaphragm which may be formed from a wide range of materials.

SUMMARY

A diaphragm valve according to the disclosure has an axially driven valve spindle, a thrust piece, and a diaphragm which includes a diaphragm body associated with the thrust piece and a diaphragm film associated with a valve seat. The valve spindle is drivingly coupled to the diaphragm body via the thrust piece, the diaphragm body being arranged axially between the thrust piece and the diaphragm film. Furthermore, the diaphragm film has an elastic modulus or modulus of elasticity of at least 1000 MPa.

It has been found according to the disclosure that in this way at least the section of the diaphragm which is in fluid contact during operation, namely in the form of the diaphragm film, can be formed from a multitude of materials, e.g. materials having a high elastic modulus, which in conventional diaphragms do not come into consideration for manufacture.

According to one aspect of the disclosure, the diaphragm film has an elastic modulus of at most 10000 MPa, preferably of at most 5000 MPa, so that the diaphragm film has a certain minimum degree of elasticity.

The diaphragm valve is e.g. a process valve.

Furthermore, the diaphragm valve can be configured to shut off and unblock liquids, i.e. the medium is e.g. a liquid.

In one embodiment, the diaphragm film includes or consists of at least one of the following materials: polyether ether ketone (PEEK), cycloolefin copolymer (COC).

Additionally or alternatively, the diaphragm body may be formed from an elastomer so that at least the thicker section of the diaphragm has a high elasticity.

Further, it may be provided that the diaphragm film includes a fastening section and a fluid contact section having a sealing section and an expansion section. The expansion section extends, at least in sections, between the sealing section and the fastening section in order to ensure a long service life of the diaphragm.

The fastening section here provides a seal that separates the medium from the environment during operation.

Furthermore, the fastening section may be a flange surrounding the fluid contact section. In this way, the number of operating cycles for which the diaphragm is designed can be further increased.

In a further embodiment, the entire expansion section has a wall thickness of between 0.05 mm and 0.8 mm. The expansion section here is e.g. that section of the diaphragm film which deforms elastically when the valve spindle is adjusted. As a result, the expansion section is, for one thing, thin enough to be elastically deformed using little force and, for another, sufficiently thick to contribute to a long service life. Furthermore, such a low wall thickness allows comparatively larger lifts to be realized.

According to one embodiment, the fluid contact section is a circular area. As a result, the diaphragm film has a geometry that is conducive to a long service life.

Furthermore, provision may be made that the expansion section includes at least one relief section having an undulating cross-section, e.g. in the unloaded state of the diaphragm film. The unloaded state here indicates a state in which the diaphragm or the diaphragm film is not mounted and is not significantly deformed by external forces. This design has the advantage that the diaphragm can withstand a particularly large number of operating cycles, so that the diaphragm valve has a long useful life.

In this connection, the at least one relief section may have, at least in sections, an undulating cross-section in a radial direction as related to a center of area of the fluid contact section or to a midpoint of a side line of the sealing section. This means that the at least one relief section is, at least in sections, made to be rotationally symmetrical to the center of area of the fluid contact section or to the midpoint of the side line of the sealing section. This is conducive to an elastic deformation of the expansion section, which ensures a long service life.

According to a further embodiment, the at least one relief section has, at least in sections, an undulating cross-section in a circumferential direction as related to a center of area of the fluid contact section or to a midpoint of a side line of the sealing section. This means that the at least one relief section has, at least in sections, one or more wave crests and/or wave troughs which extend radially outward or toward the fastening section from the center of area of the fluid contact section or from the midpoint of the side line of the sealing section. The service life of the diaphragm film can be increased by this design, since this design encourages an elastic deformation of the expansion section.

Furthermore, in one embodiment, the sealing section may extend from one side of the fastening section to a diametrically opposite side of the fastening section, e.g. straight, in order to ensure a particularly high sealing effect when the diaphragm film rests against a sealing web or web-shaped valve seat by means of the sealing section.

In a further embodiment, the sealing section has at least one sealing relief section in order to encourage an elastic deformation of the sealing section.

In this connection, the at least one sealing relief section may be designed to be complementary to the at least one relief section. In this way, the sealing relief section(s) and the relief section(s) are matched with one another such that the diaphragm film can withstand a particularly large number of operating cycles.

According to a further embodiment, the valve spindle is axially adjustable between a first position, in which a valve seat of the diaphragm valve is closed, and a second position, in which the valve seat is open. Here, the diaphragm is designed such that the diaphragm film is in an axially unloaded state in an axial position between the first and second positions of the valve spindle. In this way, the maximum expansion of the diaphragm film is less than in an embodiment in which the diaphragm film is in an axially unloaded state in the first position or the second position of the valve spindle. Thus, major expansions are avoided, which may impair the service life of the diaphragm film to a particularly great extent.

The diaphragm may be designed in such a way here that the diaphragm film is in an axially unloaded state in an axial center position between the first and second positions of the valve spindle. By selecting the axial center position for the axially unloaded state, the maximum load is only 50%. In other words, this means that the diaphragm film is expanded in both the first and the second position of the valve spindle, but only half the distance in comparison to an embodiment in which the diaphragm film is not expanded in either the first or the second position.

In an alternative embodiment, the valve spindle is axially adjustable between a first position, in which a valve seat of the diaphragm valve is closed, and a second position, in which the valve seat is open. Here, the diaphragm is designed such that it rolls from the first position toward the second position or vice versa, i.e. that the diaphragm rolls from the second position toward the first position. In this way, the diaphragm is designed as a rolling diaphragm, at least in sections, and therefore has a particularly long service life.

DETAILED DESCRIPTION

Figure 1:
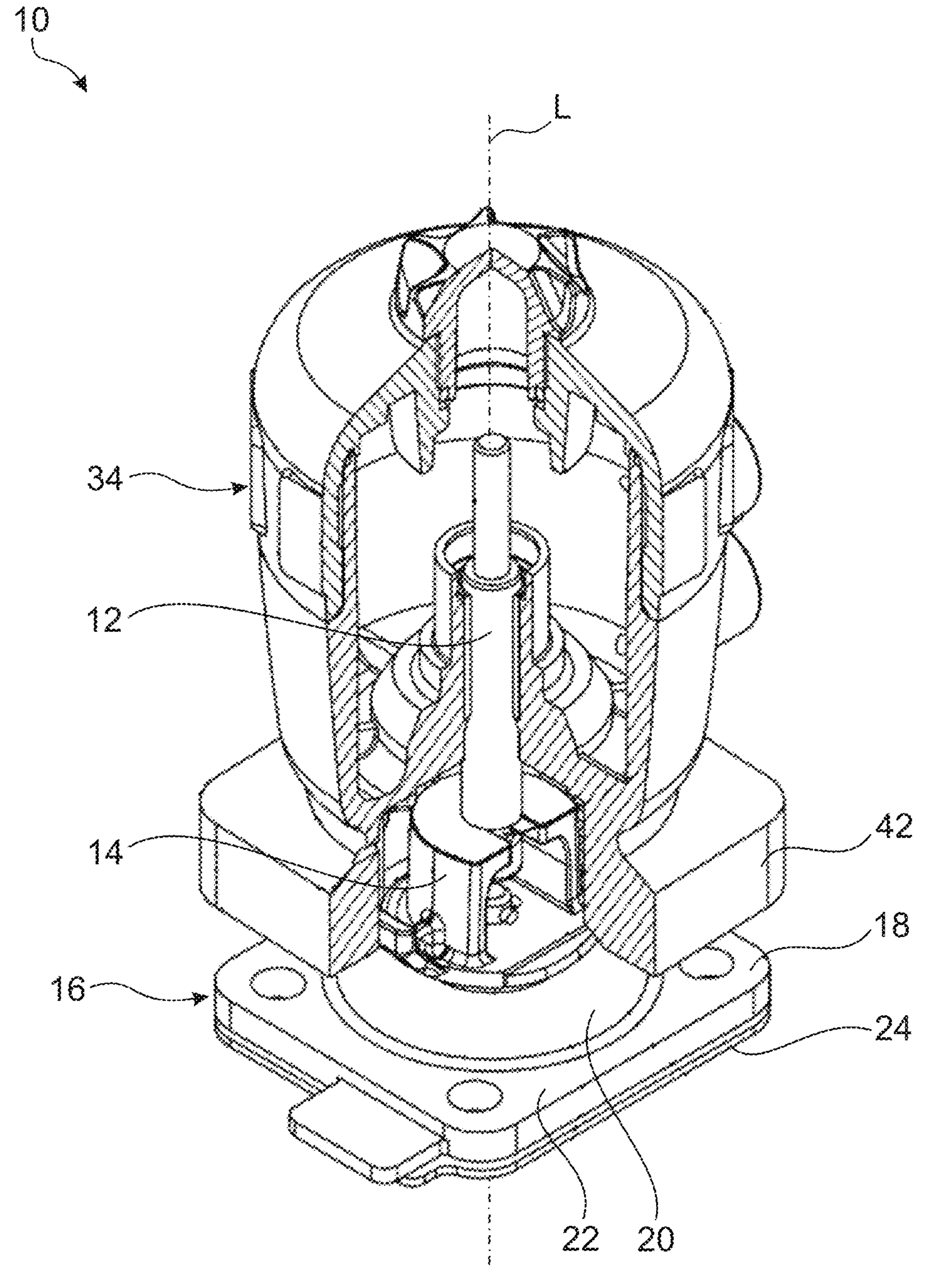
FIG. 1 shows a perspective partial sectional view of a diaphragm valve according to the disclosure with a diaphragm and a thrust piece.

FIG. 1 illustrates a diaphragm valve 10 which includes a valve spindle 12 having a longitudinal axis L, a thrust piece 14 and a diaphragm 16.

The diaphragm 16 has a diaphragm body 18 having an elastic, circular central portion 20 which is drivingly coupled to the valve spindle 12 via the thrust piece 14, and a clamping flange 22 which radially delimits the central portion 20.

Furthermore, the diaphragm 16 has a diaphragm film 24 which includes a circular fluid contact section 26 (see FIG. 3) having a central sealing section 28 and a fastening section 30 which radially delimits the fluid contact section 26 and forms a flange 32.

Figure 15:
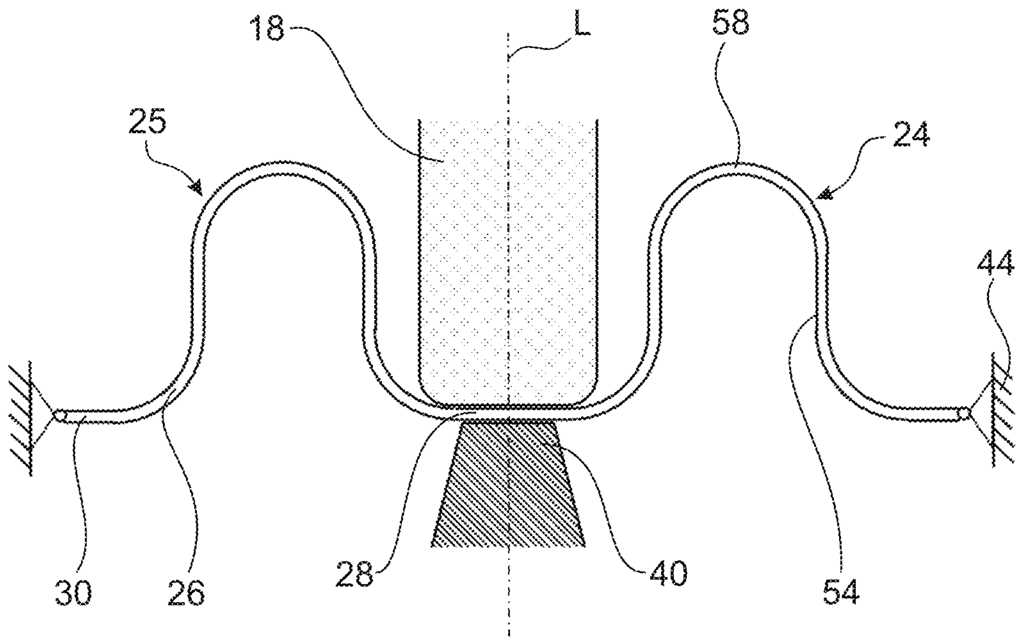
FIG. 15 shows a sectional view of the diaphragm of the diaphragm valve from FIG. 1 according to a further embodiment in a closed position of the diaphragm valve.

The diaphragm 16, e.g. the diaphragm body 18 and/or the diaphragm film 24, may be designed, at least in sections, as a rolling diaphragm 25 (see FIG. 15).

Figure 2:
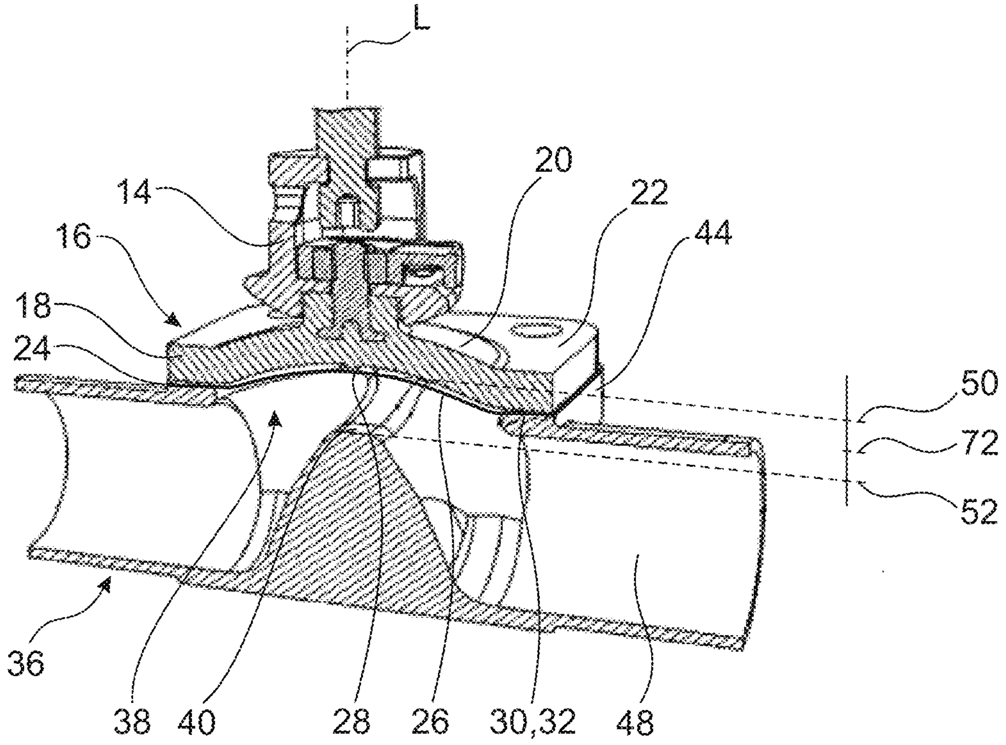
FIG. 2 shows a longitudinal sectional view of a fluid housing through which fluid flows, and the diaphragm and the thrust piece of the diaphragm valve from FIG. 1 in an open position of the diaphragm valve.

The diaphragm valve 10 further has a drive 34 (see FIG. 1), which is fastened to a fluid housing 36 (see FIG. 2) having a valve opening 38 and a web-shaped valve seat 40.

The drive 34 is only schematically depicted in FIG. 1 and may be a hydraulic, pneumatic or electric drive.

For example, the drive 34 is a preassembled, self-contained unit.

In this connection, the diaphragm 16 is clamped axially between a flange section 42 of the drive 34 and a flange section 44 of the fluid housing 36 by means of the clamping flange 22 and the fastening section 30.

The sealing section 28 is arranged opposite the valve seat 40 here.

Furthermore, the diaphragm film 24 seals the valve opening 38 in a fluid-tight manner.

The fastening section 30 here forms a seal in the form of a sealing flange.

In order to ensure a particularly strong sealing effect, the diaphragm film 24 includes an annular sealing bead 46 (see FIG. 3) at the transition between the fastening section 30 and the fluid contact section 26.

In an alternative embodiment, the sealing bead 46 may be dispensed with.

To actuate the diaphragm valve 10, the valve spindle 12 is moved axially up and down by means of the drive 34 in order to axially raise or lower the diaphragm 16 and thereby press it against the valve seat 40. In this way, the flow cross-section of a respective pipe 48 (see FIG. 2) of the fluid housing 36 can be opened to a greater or lesser extent.

The valve spindle 12 is axially adjustable here between a first position 50, in which the sealing section 28 rests tightly against the valve seat 40, closing it completely, and a second position 52, in which the valve seat 40 is completely open, i.e. the flow cross-section is at a maximum.

The first position 50 thus constitutes an open position of the diaphragm valve 10, while the second position 52 constitutes a closed position of the diaphragm valve 10.

The diaphragm valve 10 is constructed such that the diaphragm 16 can be replaced in the event of a defect in the diaphragm 16.

In the present embodiment, the valve spindle 12 is adapted to be coupled to and uncoupled from the diaphragm 16 by way of the thrust piece 14 in a non-destructive manner and preferably without using a tool. This coupling and uncoupling is performed without disassembling the drive 34. For disassembly, it is only necessary to detach the drive 34 from the fluid housing 36. After removing the drive 34 from the fluid housing 36, the diaphragm 16 can then be replaced.

Figure 3:
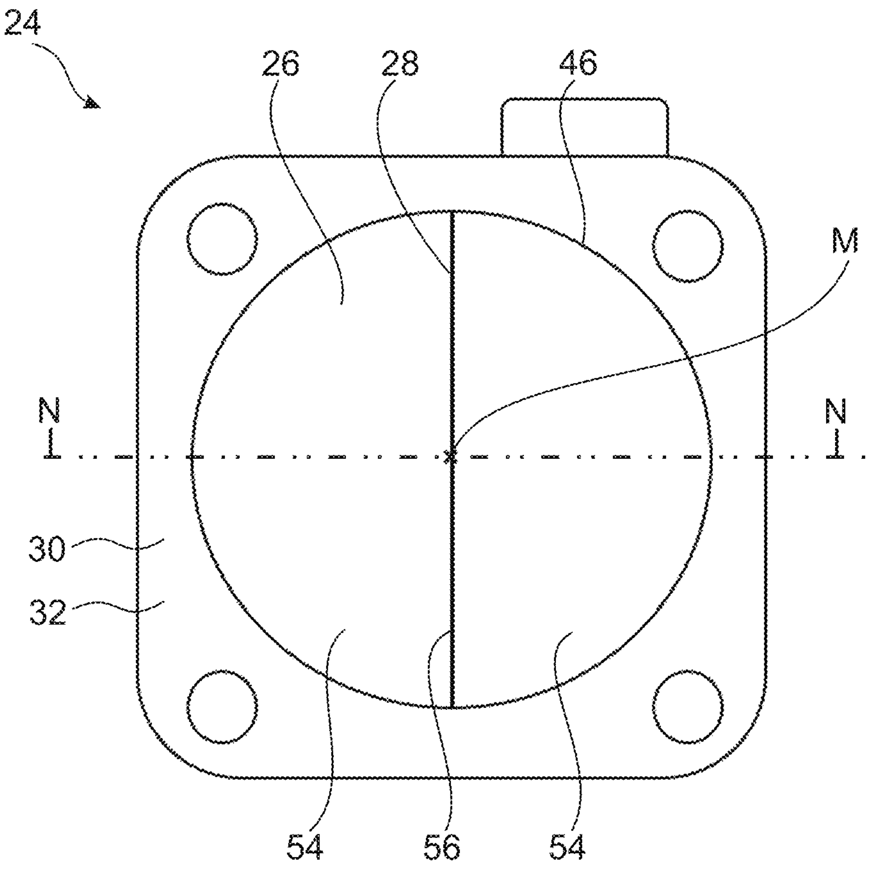
FIG. 3 shows a bottom view of a diaphragm film of the diaphragm from FIG. 1 according to a first embodiment.
Figure 4:
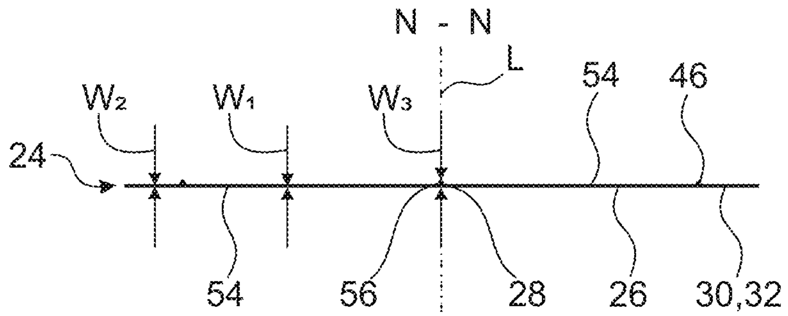
FIG. 4 shows a sectional view taken through the plane N-N in FIG. 3.

With reference to FIGS. 3 and 4, the structure of the diaphragm 16, e.g. the diaphragm film 24, will be described in more detail below.

The diaphragm body 18 is made from an elastomer.

In an alternative embodiment, the diaphragm body 18 may be formed from any desired elastic material, for example ethylene propylene diene monomer rubber (EPDM), PEEK or COC.

The diaphragm film 24 consists of PEEK and has an elastic modulus of 3600 MPa. The present idea is not intended to be limited to this embodiment.

Basically, the diaphragm film 24 may consist of any desired material having an elastic modulus between 1000 MPa and 10000 MPa, for example COC or a composite or a material compound containing PEEK and/or COC.

In one embodiment, the elastic modulus of the diaphragm body 18 is smaller than the elastic modulus of the diaphragm film 24 by a factor of more than 10, e.g. more than 100.

The fluid contact section 26 has two expansion sections 54, each of which extends between the sealing section 28 and the fastening section 30 and deforms elastically when the diaphragm valve 10 is adjusted from the open position to the closed position, or vice versa.

The sealing section 28 extends in the form of a straight line from one side of the fastening section 30 through the center of area M of the fluid contact section 26 and to an opposite side of the fastening section 30.

In this context, the two expansion sections 54 are designed to be mirror-symmetrical with respect to the sealing section 28, although this may be different in an alternative embodiment.

The expansion sections 54 each have a wall thickness $W_1$ of 0.4 mm.

In principle, the expansion sections 54 may each have any desired wall thickness $W_1$, e.g. a wall thickness $W_1$ in a range from 0.05 mm to 0.8 mm.

The fastening section 30 may have a wall thickness $W_2$ that is equal to or greater than the wall thickness $W_1$ of the expansion section 54.

The sealing section 28 may have a wall thickness $W_3$ that is equal to or greater than the wall thickness $W_1$ of the expansion section 54.

In the illustrated embodiment, the sealing section 28 has a sealing bead 56 having a wall thickness $W_3$ of 1 mm.

Basically, the wall thickness $W_3$ of the sealing bead 56 may be of any desired size.

In an alternative embodiment, the sealing section 28 has no sealing bead 56.

In one embodiment, the entire diaphragm film 24 or each section of the diaphragm film 24 has a wall thickness each in a range of from 0.05 mm to 0.8 mm.

In order to reduce stresses or the loads in the fluid contact section 26 that occur during operating cycles between the first position 50 and the second position 52, the diaphragm film 24 may include further structures which will be discussed below with reference to FIGS. 5 to 14.

Figure 5:
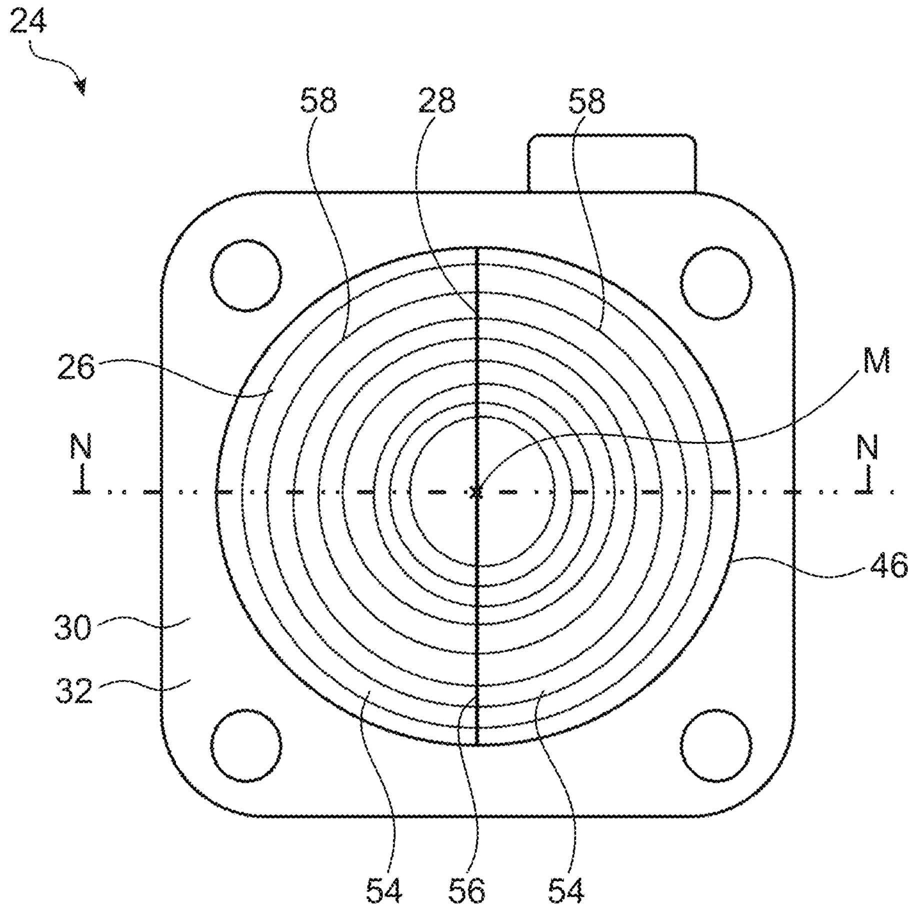
FIG. 5 shows a bottom view of a diaphragm film of the diaphragm from FIG. 1 according to a second embodiment.
Figure 6:
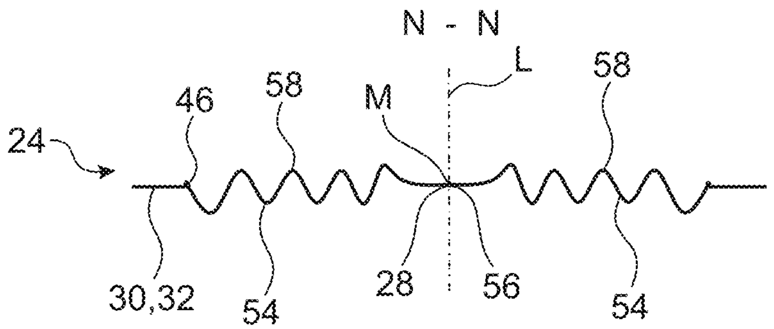
FIG. 6 shows a sectional view taken through the plane N-N in FIG. 5.

With reference to FIGS. 5 and 6, a diaphragm film 24 according to a second embodiment will now be described. The same reference numbers will be used for the components or sections known from the above embodiment, and reference is made to the preceding discussions in this respect.

Unlike in the embodiment illustrated in FIGS. 3 and 4, each expansion section 54 includes a relief section 58, which has a wave-shaped cross-section (see FIG. 6) in the unloaded state of the diaphragm film 24.

The waves of the two relief sections 58 here extend in concentric circles (see FIG. 5) around the center of area M and radially away from the center of area M in cross-section.

The lines in the bottom view in FIG. 6 here represent the profile of the peaks of the wave troughs and wave crests of the relief sections 58 in a plane perpendicular to the longitudinal axis L.

Figure 7:
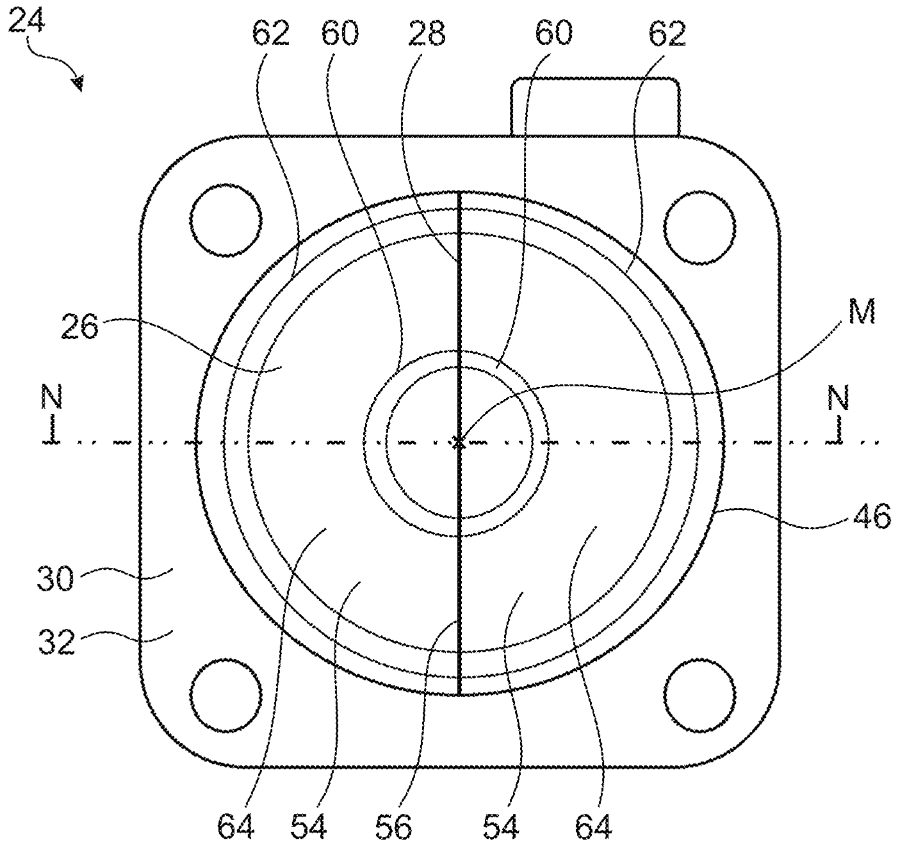
FIG. 7 shows a bottom view of a diaphragm film of the diaphragm from FIG. 1 according to a third embodiment.
Figure 8:
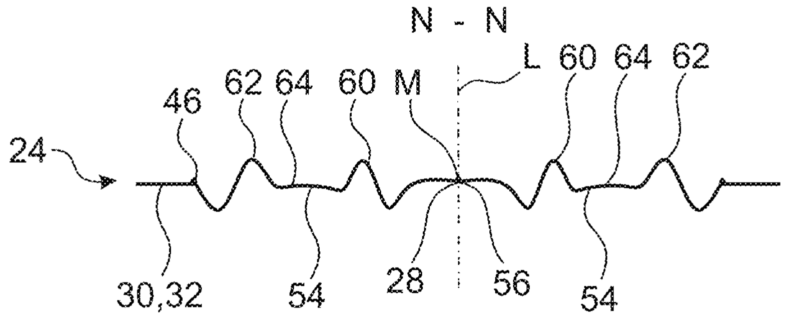
FIG. 8 shows a sectional view taken through the plane N-N in FIG. 7.

With reference to FIGS. 7 and 8, a diaphragm film 24 according to a third embodiment will now be described. The same reference numbers will be used for the components or sections known from the above embodiments, and reference is made to the preceding discussions in this respect.

Unlike in the embodiment illustrated in FIGS. 3 and 4, each expansion section 54 includes an inner relief section 60 and an outer relief section 62, which are radially separated from each other by a planar section 64.

The inner relief sections 60 and the outer relief sections 62 each have a wave-shaped cross-section in the unloaded state of the diaphragm film 24 (see FIG. 8).

The waves of the relief sections 60, 62 here extend in concentric circles (see FIG. 7) around the center of area M and radially away from the center of area M in cross-section.

Figure 9:
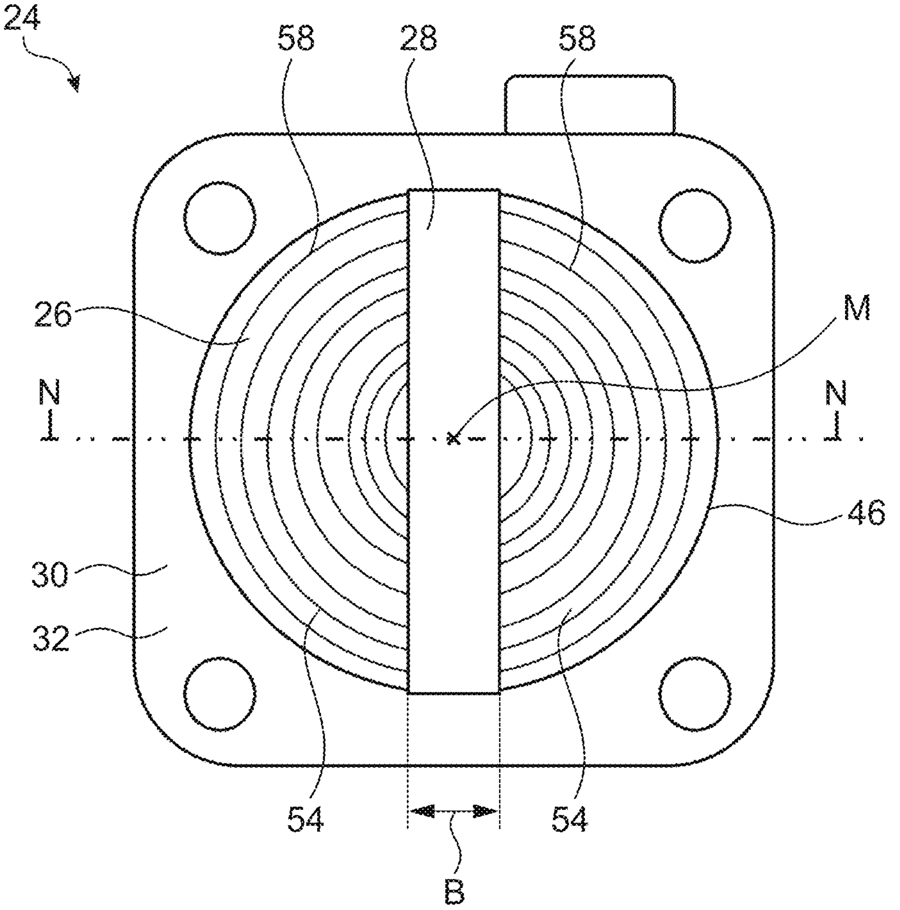
FIG. 9 shows a bottom view of a diaphragm film of the diaphragm from FIG. 1 according to a fourth embodiment.
Figure 10:
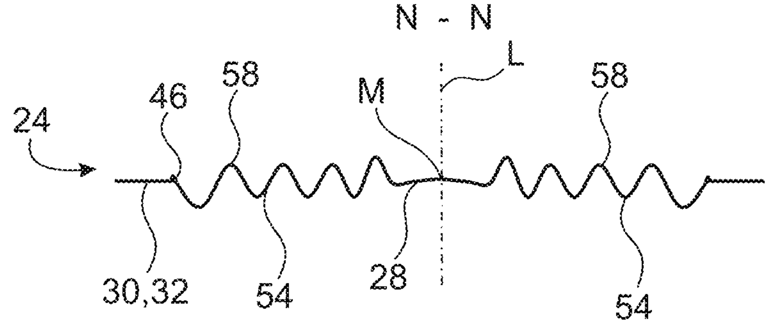
FIG. 10 shows a sectional view taken through the plane N-N in FIG. 9.

With reference to FIGS. 9 and 10, a diaphragm film 24 according to a fourth embodiment will now be described. The same reference numbers will be used for the components or sections known from the above embodiments, and reference is made to the preceding discussions in this respect.

Unlike in the embodiment illustrated in FIGS. 5 and 6, the sealing section 28 is of a rectangular or strip-shaped design and has a width B.

Furthermore, in this embodiment, the sealing section 28 does not have a sealing bead 56.

Figure 11:
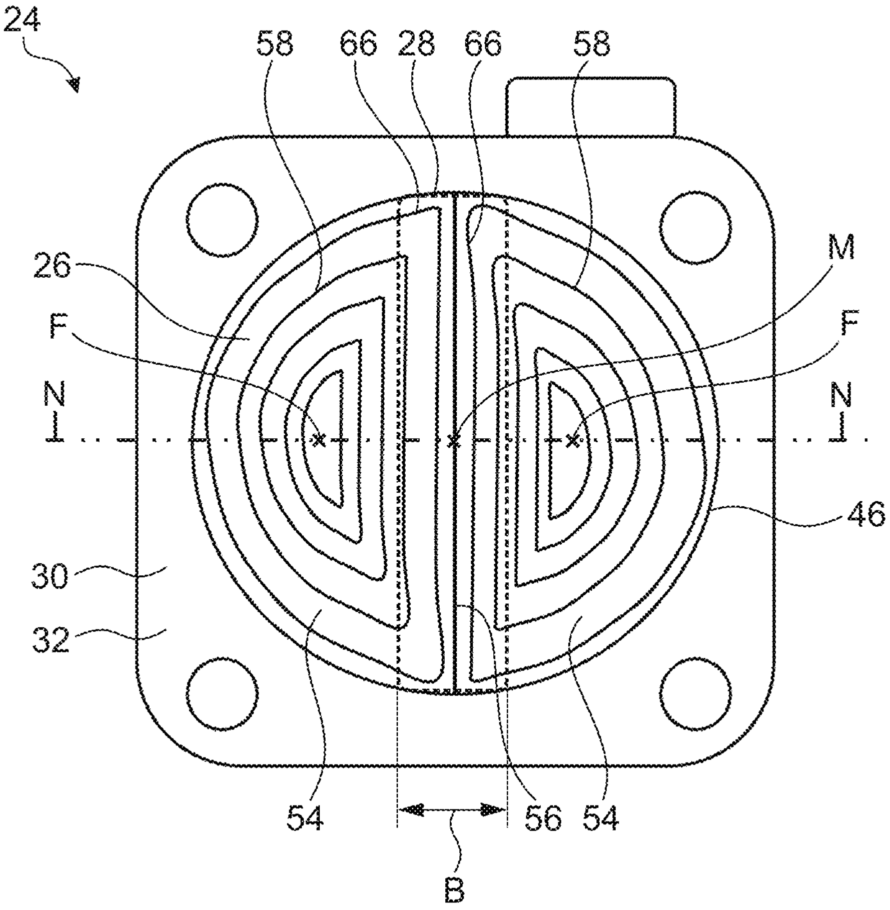
FIG. 11 shows a bottom view of a diaphragm film of the diaphragm from FIG. 1 according to a fifth embodiment.
Figure 12:
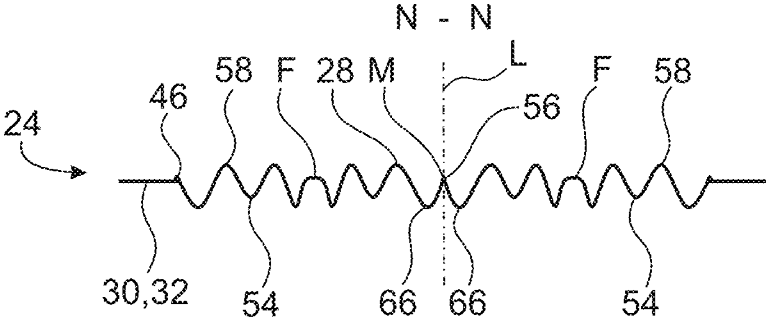
FIG. 12 shows a sectional view taken through the plane N-N in FIG. 11.

With reference to FIGS. 11 and 12, a diaphragm film 24 according to a fifth embodiment will now be described. The same reference numbers will be used for the components or sections known from the above embodiments, and reference is made to the preceding discussions in this respect.

Unlike in the embodiment illustrated in FIGS. 5 and 6, the sealing section 28 is of a rectangular or strip-shaped design and has a width B and includes two sealing relief sections 66 which are designed to be complementary to the relief sections 58.

The relief sections 58 and the sealing relief sections 66 form D-shaped wave structures here (see FIG. 11), which extend concentrically around a center of area F of half of a circle of the fluid contact section 26.

Figure 13:
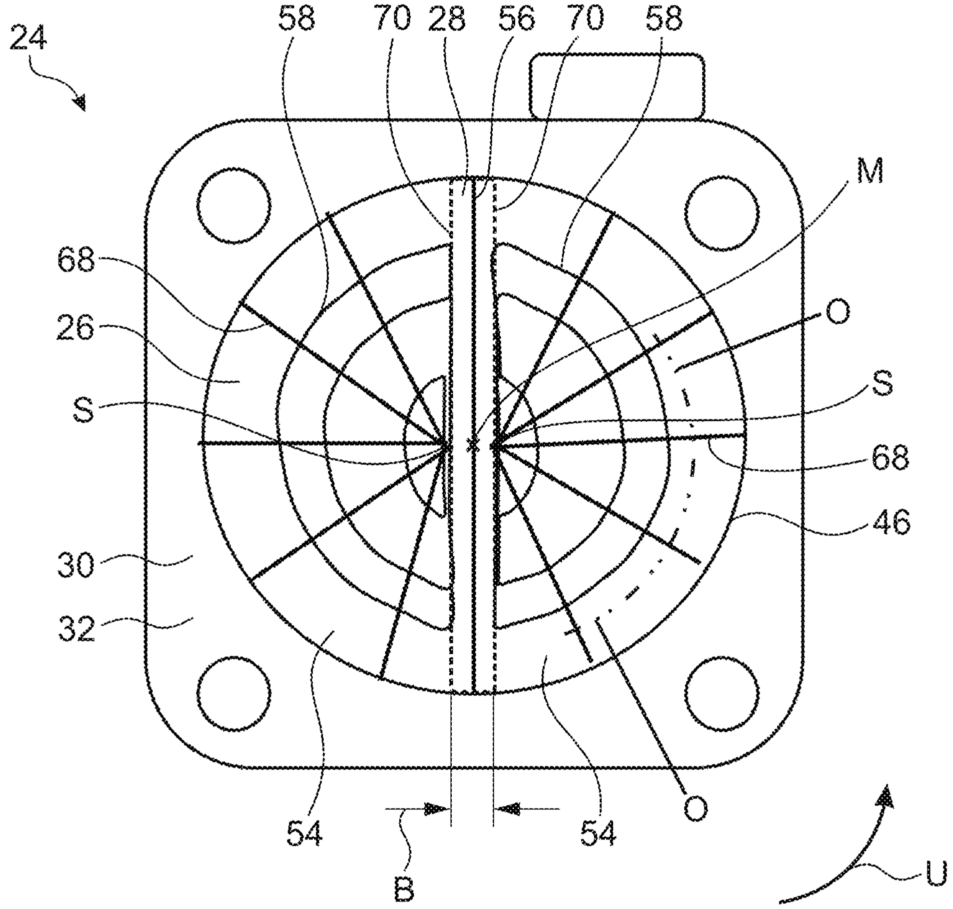
FIG. 13 shows a bottom view of a diaphragm film of the diaphragm from FIG. 1 according to a sixth embodiment.
Figure 14:
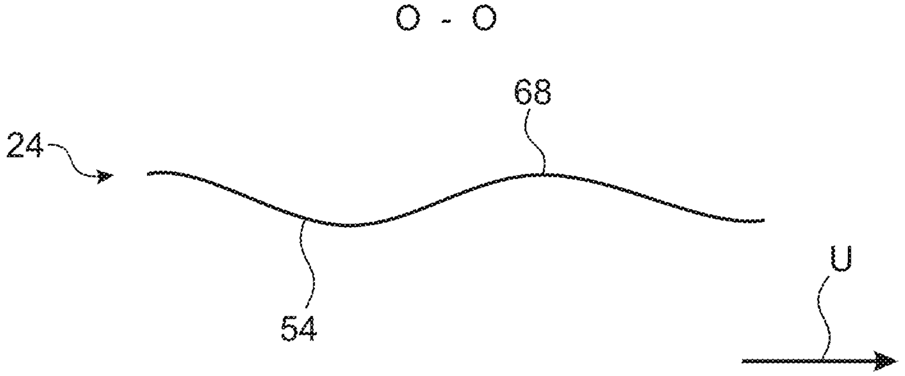
FIG. 14 shows a sectional view taken through the bent sectional surface O-O in FIG. 13.

With reference to FIGS. 13 and 14, a diaphragm film 24 according to a sixth embodiment will now be described. The same reference numbers will be used for the components or sections known from the above embodiments, and reference is made to the preceding discussions in this respect.

Unlike in the embodiment illustrated in FIGS. 3 and 4, the sealing section 28 is of a rectangular or strip-shaped design and has a width B.

Furthermore, each expansion section 54 includes a relief section 68 which, in the unloaded state of the diaphragm film 24, has a wave-shaped cross-section (see FIG. 14) in a circumferential direction U about a midpoint S of a side line 70 of the sealing section 28.

The expansion sections 54 may additionally include relief sections 58 which, in cross-section, extend radially away from the center of area M or one of the midpoints S.

Basically, all of the relief sections 58, 60, 62, 68 and sealing relief sections 66 can be combined with one another as desired.

Moreover, all of the relief sections 58, 60, 62, 68 and sealing relief sections 66 may each be individually designed, in particular with regard to the amplitude and frequency of their undulation.

The diaphragm film 24 may include relief sections 58, 60, 62, 68 and/or sealing relief sections 66 in portions of the fluid contact section 26 that are subjected to particularly high loads during operating cycles.

The relief sections 58, 60, 62, 68 and/or sealing relief sections 66 are designed in such a way that these loads are reduced in a targeted manner in order to increase the service life or useful life of the diaphragm 16.

To this end, a method of manufacturing the diaphragm 16 may comprise a step in which, in a practical test, a diaphragm film 24 without relief sections 58, 60, 62, 68 and/or sealing relief sections 66 is first used in the diaphragm valve 10 for a certain number of operating cycles and, in a subsequent step, a diaphragm film 24 is designed to include relief sections 58, 60, 62, 68 and/or sealing relief sections 66, which purposefully compensates for or at least reduces the stresses occurring in the practical test.

In order to form the relief sections 58, 60, 62, 68 and/or the sealing relief sections 66, the diaphragm film 24 is thermally deformed plastically.

In one embodiment, the diaphragm 16 is configured such that when the diaphragm film 24 is in an axial center position 72 (see FIG. 2) between the first position 50 and the second position 52, it is in a state in which the stresses or loads on the diaphragm film 24 are at a minimum.

In all embodiments, the diaphragm body 18, e.g. the central portion 20, may include relief sections 58, 60, 62, 68 and/or sealing relief sections 66, by analogy with the diaphragm film 24.

Furthermore, the diaphragm body 18 is connected to the diaphragm film 24 by a substance-to-substance bond, a force fit and/or a form fit.

Here, the diaphragm film 24 may be connected to the diaphragm body 18 over its entire surface or in sections.

The diaphragm film 24 is fastened to the diaphragm body 18 at least at the center of area M.

In one embodiment, the diaphragm film 24 is connected to the diaphragm body 18 by means of the sealing section 28 and the fastening section 30, whereas the expansion sections 54 are not fastened to the diaphragm body 18 and can in particular deform elastically free thereof.

In a further embodiment, the diaphragm 16 is laminated. In this process, the components are first etched slightly, then treated with an adhesive agent and, in a final step, thermally pressed together.

This may be performed over the entire surface or only in sections, for example by applying the adhesive agent via a mask or matrix.

In an alternative embodiment, the components are connected to each other using appropriate plug connections, for example by means of metal pins.

In this way, a diaphragm valve 10 is provided having a diaphragm 16 which is formed, at least in sections, from a material having a high elastic modulus, and at the same time has a long useful life.

The disclosure is not limited to the embodiments shown. In particular, individual features of one embodiment may be combined with features of other embodiments as desired, in particular independently of the other features of the respective embodiments.

The invention claimed is:

1. A diaphragm valve comprising:

an axially driven valve spindle;

a thrust piece; and a diaphragm which includes a diaphragm body associated with the thrust piece and a diaphragm film associated with a valve seat, wherein the valve spindle is drivingly coupled to the diaphragm body via the thrust piece, the diaphragm body being arranged axially between the thrust piece and the diaphragm film, wherein the diaphragm film has an elastic modulus of at least 1000 MPa, wherein the diaphragm film includes a fastening section and a fluid contact section having a sealing section and an expansion section, the expansion section extending, at least in sections, between the sealing section and the fastening section, wherein the expansion section includes at least one relief section having an undulating cross-section, wherein the at least one relief section has, at least in sections, an undulating cross-section in a circumferential direction as related to a center of area of the fluid contact section or to a midpoint of a side line of the sealing section, and wherein the valve spindle is axially adjustable between a first position, in which the valve seat of the diaphragm valve is closed, and a second position, in which the valve seat is open, the diaphragm being designed such that the diaphragm film is in an axially unloaded state in an axial position between the first and second positions of the valve spindle.

2. The diaphragm valve according to claim 1, wherein the diaphragm film includes or consists of at least one of the following materials: polyether ether ketone, cycloolefin copolymer.

3. The diaphragm valve according to claim 1, wherein the diaphragm body is formed from an elastomer.

4. The diaphragm valve according to claim 1, wherein the fastening section is a flange surrounding the fluid contact section.

5. The diaphragm valve according to claim 1, wherein the entire expansion section has a wall thickness of between 0.05 mm and 0.8 mm.

6. The diaphragm valve according to claim 1, wherein the fluid contact section is a circular area.

7. The diaphragm valve according to claim 1, wherein the expansion section includes at least one relief section having an undulating cross-section in an unloaded state of the diaphragm film.

8. The diaphragm valve according to claim 1, wherein the at least one relief section has, at least in sections, an undulating cross-section in a radial direction as related to the center of area of the fluid contact section or to the midpoint of the side line of the sealing section.

9. The diaphragm valve according to claim 1, wherein the diaphragm being designed such that the diaphragm film is in an axial center position between the first and second positions of the valve spindle in an axially unloaded state.

10. The diaphragm valve according to claim 1, wherein the sealing section extends from one side of the fastening section to a diametrically opposite side of the fastening section.

11. The diaphragm valve according to claim 10, wherein the sealing section extends straight from one side of the fastening section to a diametrically opposite side of the fastening section.

12. A diaphragm valve comprising:

an axially driven valve spindle;

a thrust piece; and a diaphragm which includes a diaphragm body associated with the thrust piece and a diaphragm film associated with a valve seat, wherein the valve spindle is drivingly coupled to the diaphragm body via the thrust piece, the diaphragm body being arranged axially between the thrust piece and the diaphragm film, wherein the diaphragm film has an elastic modulus of at least 1000 MPa, wherein the diaphragm film includes a fastening section and a fluid contact section having a sealing section and an expansion section, the expansion section extending, at least in sections, between the sealing section and the fastening section, wherein the expansion section includes at least one relief section having an undulating cross-section, wherein the at least one relief section has, at least in sections, an undulating cross-section in a circumferential direction as related to a center of area of the fluid contact section or to a midpoint of a side line of the sealing section, and wherein the sealing section has at least one sealing relief section.

13. The diaphragm valve according to claim 12, wherein the at least one sealing relief section is designed to be complementary to the at least one relief section.

* * * * *